(12) United States Patent
Tamaoki et al.

(10) Patent No.: US 12,618,811 B2
(45) Date of Patent: May 5, 2026

(54) PREPARATIVE LIQUID CHROMATOGRAPH

(71) Applicant: SHIMADZU CORPORATION, Kyoto (JP)

(72) Inventors: Soichiro Tamaoki, Kyoto (JP); Tomoyuki Yamazaki, Kyoto (JP); Shohei Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 314 days.

(21) Appl. No.: 18/279,822

(22) PCT Filed: Nov. 8, 2021

(86) PCT No.: PCT/JP2021/040944
§ 371 (c)(1),
(2) Date: Aug. 31, 2023

(87) PCT Pub. No.: WO2022/190457
PCT Pub. Date: Sep. 15, 2022

(65) Prior Publication Data
US 2024/0151694 A1 May 9, 2024

(30) Foreign Application Priority Data
Mar. 9, 2021 (JP) ................................. 2021-037101

(51) Int. Cl.
*G01N 30/24* (2006.01)
*G01N 30/82* (2006.01)
*G01N 30/02* (2006.01)

(52) U.S. Cl.
CPC ............. *G01N 30/24* (2013.01); *G01N 30/82* (2013.01); *G01N 2030/027* (2013.01)

(58) Field of Classification Search
CPC .. G01N 30/24; G01N 30/82; G01N 2030/027; G01N 30/8631; G01N 30/20; G01N 30/04; G01N 30/80; G01N 35/10
(Continued)

(56) References Cited

U.S. PATENT DOCUMENTS

2013/0288355 A1 10/2013 DeWitte et al.
2015/0056689 A1 2/2015 DeWitte et al.

FOREIGN PATENT DOCUMENTS

JP 2000162217 A 6/2000
JP 2011-33556 A 2/2011
JP 2017-096958 A 6/2017

OTHER PUBLICATIONS

Office Action for corresponding Japanese Patent Application No. 2023-505096 issued Mar. 26, 2024, with English machine translation.
(Continued)

*Primary Examiner* — Robert R Raevis
(74) *Attorney, Agent, or Firm* — Renner, Otto, Boisselle & Sklar, LLP

(57) ABSTRACT

A separation channel on which a liquid delivery pump, a separation column, and a detector are provided, the liquid delivering pump being for feeding a mobile phase, the separation column being for separating a component in a sample, and the detector being for detecting peaks of components separated from each other by the separation column, a plurality of liquid handlers each including an injecting part and a collecting part, wherein when one of the plurality of liquid handlers is introduced into the separation channel, the injecting part of the one of the plurality of liquid handlers functions as an injector that executes injection operation of a sample into a mobile phase flowing through the analysis channel upstream of the separation column in the analysis channel and the collecting part of the one the plurality of
(Continued)

liquid handlers functions as a fraction collector that executes collection operation of peaks of components separated from each other in the separation column, a selector for selectively switching a liquid handler to be introduced into the separation channel among a plurality of the liquid handlers, and a controller for controlling operation of a plurality of the liquid handlers and the selector.

2 Claims, 4 Drawing Sheets

(58) Field of Classification Search
USPC ........... 73/23.41, 23.42, 61.55, 61.56, 64.56, 73/864.21, 864.22, 864.24, 864.25, 73/864.83; 422/63, 70, 89, 501, 509, 422/510; 210/656, 657; 95/82, 85; 96/101, 103, 105
See application file for complete search history.

(56) References Cited

OTHER PUBLICATIONS

Office Action for corresponding Chinese Patent Application No. 202180084540.0 dated May 30, 2025, with machine translation.
International Search Report for corresponding International Application No. PCT/JP2021/040944 mailed Jan. 25, 2022, with English translation.
Translation of Written Opinion for corresponding International Application No. PCT/JP2021/040944 mailed Jan. 25, 2022.

FIG. 2

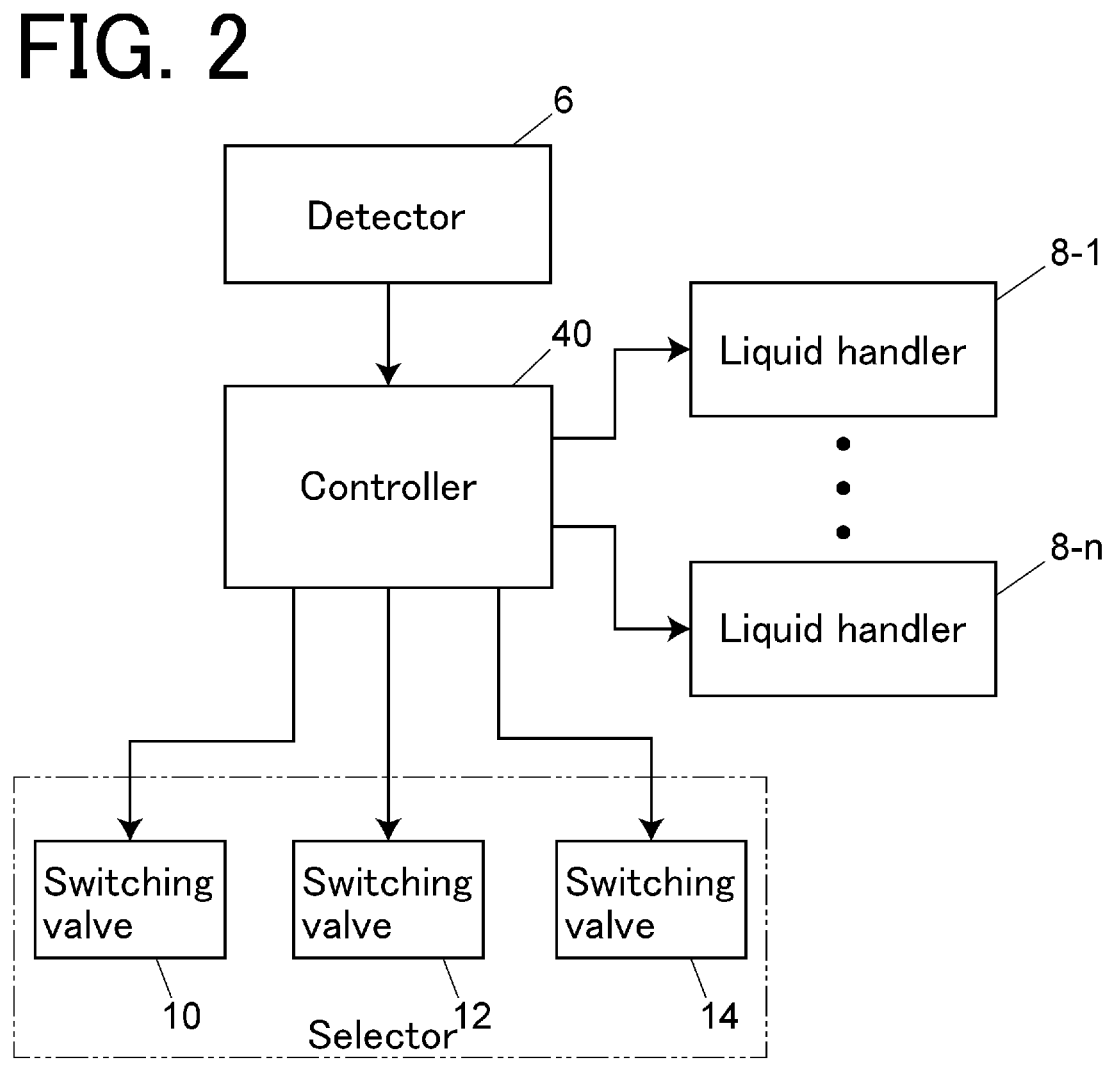

Detector — 6

Controller — 40

Liquid handler — 8-1

Liquid handler — 8-n

Switching valve — 10

Switching valve — 12

Switching valve — 14

Selector

PREPARATIVE LIQUID CHROMATOGRAPH

TECHNICAL FIELD

The present invention relates to a preparative liquid chromatograph.

BACKGROUND ART

A preparative liquid chromatograph is a device that separates components in a sample injected into a mobile phase by an injector, detects peaks of the components, and fractionates and collects an eluate portion corresponding to each peak in an individual container. As elements constituting the preparative liquid chromatograph, there are a liquid delivery pump for feeding a mobile phase, an injector for injecting a sample into a mobile phase, a separation column for separating a component in a sample, a detector for detecting a peak of a component separated by the separation column, and a fraction collector for collecting a peak detected by the detector into an individual collection container.

Further, in the preparative liquid chromatograph, a liquid handler having both functions of the injector and the fraction collector may be used (see Patent Document 1). When the liquid handler having both functions of the injector and the fraction collector is used, a component fractionated and collected in the fraction collector can be automatically reinjected to perform separation analysis.

PRIOR ART DOCUMENT

Patent Document

Patent Document 1: Japanese Patent Laid-open Publication No. 2000-162217

SUMMARY OF THE INVENTION

Problems to be Solved by the Invention

A liquid handler includes a needle for sucking and injecting operation of a sample and a probe for collecting operation of a peak of a separated component, but the needle and the probe often cannot operate completely independently, and operation of the needle during peak collecting operation using the probe is often limited. For this reason, in a case where separation and collection of a plurality of samples are performed, preparation operation such as suction of a next sample needs to be performed after collecting operation by the probe is completed, and separation and collection of a plurality of samples have not been able to be continuously performed.

The present invention has been made in view of the above problem, and an object of the present invention is to enable separation and collection of a plurality of samples to be continuously executed in a preparative liquid chromatograph using a liquid handler.

Solutions to the Problems

A preparative liquid chromatograph according to the present invention includes a separation channel on which a liquid delivery pump, a separation column, and a detector are provided, the liquid delivering pump being for feeding a mobile phase, the separation column being for separating a component in a sample, and the detector being for detecting peaks of components separated from each other by the separation column, a plurality of liquid handlers each including an injecting part and a collecting part, wherein when one of the plurality of liquid handlers is introduced into the separation channel, the injecting part of the one of the plurality of liquid handlers functions as an injector that executes injection operation of a sample into a mobile phase flowing through the analysis channel upstream of the separation column in the analysis channel and the collecting part of the one the plurality of liquid handlers functions as a fraction collector that executes collection operation of peaks of components separated from each other in the separation column, a selector for selectively switching a liquid handler to be introduced into the separation channel among a plurality of the liquid handlers, and a controller for controlling operation of a plurality of the liquid handlers and the selector, the controller being configured to introduce a plurality of the liquid handlers into the separation channel in predetermined order, to cause each of the liquid handlers to execute the injection operation and the collection operation, and to sequentially execute separation and collection of a plurality of samples allocated to each of a plurality of the liquid handlers. The controller is configured to cause each of a plurality of the liquid handlers to execute preparatory operation for the injection operation while another one of the liquid handlers is being introduced into the separation channel, and to execute the injection operation immediately after being introduced into the separation channel.

Effects of the Invention

In a preparative liquid chromatograph according to the present invention, a plurality of liquid handlers are introduced into a separation channel in predetermined order to cause each liquid handler to execute injection operation and collection operation, separation and collection of a plurality of samples allocated to each of a plurality of the liquid handlers are sequentially executed, and each of a plurality of the liquid handlers is configured to execute preparation operation for the injection operation while another one of the liquid handlers is being introduced into the separation channel and to execute the injection operation immediately after the another one of the liquid handlers is introduced into the separation channel, so that separation and collection of a plurality of samples can be continuously executed.

BRIEF DESCRIPTION OF THE DRAWINGS

FIG. 2 is a block diagram illustrating a control system of the implementation example.

EMBODIMENT OF THE INVENTION

Hereinafter, an implementation example of a preparative liquid chromatograph according to the present invention will be described with reference to the accompanying drawings.

Figure 1:
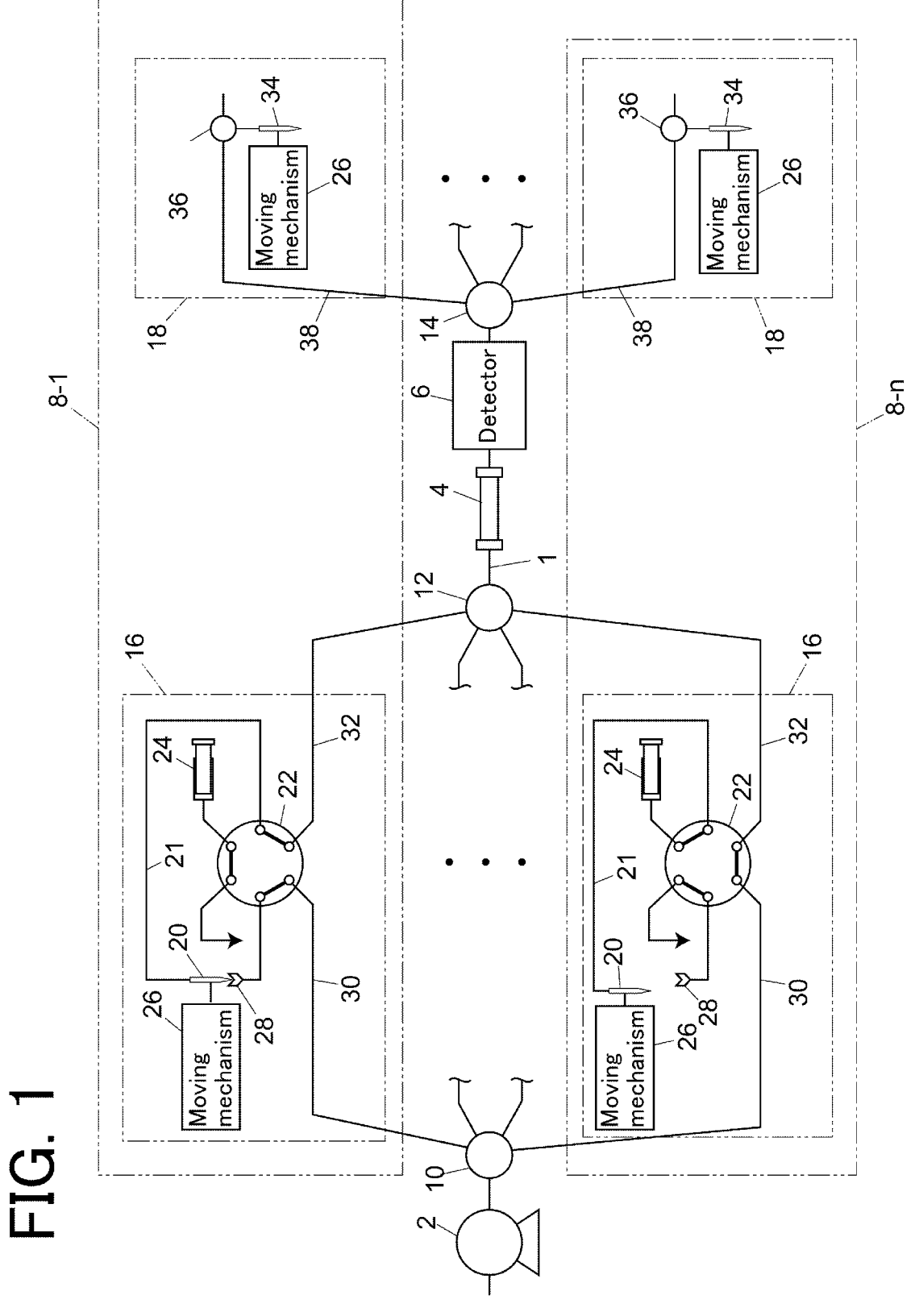
FIG. 1 is a schematic channel configuration diagram illustrating an implementation example of a preparative liquid chromatograph.

As illustrated in FIG. 1, the preparative liquid chromatograph of the present implementation example includes a separation channel 1 for separating and collecting a sample, and a liquid delivery pump 2, a switching valve 10, a switching valve 12, a separation column 4, a detector 6, and a switching valve 14 are provided on the separation channel 1 from the upstream side. The preparative liquid chromatograph further includes two or more liquid handlers 8-1 to 8-$n$ each having an injecting part 16 and a collecting part 18. The switching valves 10, 12, and 14 are multi-port valves, and constitute a selector that selectively introduces any one of the liquid handlers 8-1 to 8-$n$ into the separation channel 1 by interlocking with each other. Introducing the liquid handler into the separation channel 1 means that, when the liquid handler 8-1 is described as an example, the injecting part 16 of the liquid handler 8-1 is interposed between the liquid delivery pump 2 and the separation column 4, and the collecting part 18 of the liquid handler 8-1 is connected to the downstream side of the detector 14.

Each of the injecting parts 16 of the liquid handlers 8-1 to 8-$n$ functions as an injector that executes injection operation of a sample into a mobile phase flowing through a separation channel when introduced into the separation channel 1. Each of the collecting parts 18 of the liquid handlers 8-1 to 8-$n$ functions as a fraction collector that executes collection operation of a peak of a sample separated by the separation column 4 when introduced into the separation channel 1.

Each of the injecting parts 16 of the liquid handlers 8-1 to 8-$n$ includes a needle 20, a high-pressure valve 22, a syringe 24, a moving mechanism 26, and an injection port 28. One of ports of the high-pressure valve 22 of each of the injecting parts 16 is connected to a port of the switching valve 10 via an inlet channel 30, and another port is connected to the switching valve 12 via an outlet channel 32. By the above, the switching valves 10 and 12 can selectively introduce any one of the injecting parts 16 of the liquid handlers 8-1 to 8-$n$ between the liquid delivery pump 2 and the separation column 4.

A sampling channel 21 leading to the needle 20, the syringe 24, the drain, and the injection port 28 are connected to another port of the high-pressure valve 22 of each of the injecting parts 16. The high-pressure valve 22 is a two-position valve that switches between two modes of an injection mode and a loading mode. In the injection mode, a port to which the inlet channel 30 is connected and the port to which the injection port is connected communicate with each other, and a port to which the outlet channel 32 is connected and a port to which the sampling channel 21 is connected communicate with each other. In the loading mode, a port to which the inlet channel 30 is connected and a port to which the outlet channel 32 is connected communicate with each other, a port to which the syringe 24 is connected and a port to which the sampling channel 21 is connected communicate with each other, and a port to which the injection port 28 is connected and a port leading to the drain communicate with each other.

The needle 20 of the injecting part 16 is three-dimensionally moved by the moving mechanism 26. The moving mechanism 26 is, for example, an arm that is three-dimensionally movable. When the high-pressure valve 22 is in the loading mode, the injecting part 16 can pull out the needle 20 from the injection port 28 and execute preparation operation such as cleaning of the needle 20 or suction of a sample from a sample container. After a sample is sucked from a tip of the needle 20, the needle 20 is inserted into and connected to the injection port 28, and the high-pressure valve 22 is switched to the injection mode, so that a sample is injected into a mobile phase flowing through the separation channel 1. Note that, in the present implementation example, each of the injecting parts 16 is configured to function as an injector of a total volume injection system when introduced into the separation channel 1, but the present invention is not limited to this configuration, and may be configured to function as an injector of a loop injection system when introduced into the separation channel 1.

Each port of the switching valve 14 is connected to a collection channel 38 leading to each of the collecting parts 18 of the liquid handlers 8-1 to 8-$n$. The switching valve 14 can selectively connect any of the collecting parts 18 of the liquid handlers 8-1 to 8-$n$ to the downstream side of the detector 6. Each of the collecting parts 18 of the liquid handlers 8-1 to 8-$n$ includes a probe 34 and an electromagnetic valve 36. The electromagnetic valve 36 of each of the collecting parts 18 selectively connects the collection channel 38 to either the probe 34 or the drain. The probe 34 is three-dimensionally moved by the moving mechanism 26 also used for the needle 20 of the injecting part 16.

As illustrated in FIG. 2, operation of the liquid handlers 8-1 to 8-$n$ and the switching valves 10, 12, and 14 are controlled by a controller 40. The controller 40 is configured to introduce the liquid handlers 8-1 to 8-$n$ into the separation channel 1 in predetermined order while switching the switching valves 10, 12, and 14 according to a preset program, and to separate and collect a plurality of samples allocated to the liquid handlers 8-1 to 8-$n$. In collection of a sample, a peak of a component in the sample is detected from a chromatogram obtained based on an output signal of the detector 6, and an eluate portion corresponding to each peak is fractionated and collected in an individual collection container. The controller 40 can be realized by a computer circuit including a central processing unit (CPU) and the like.

Figure 3:
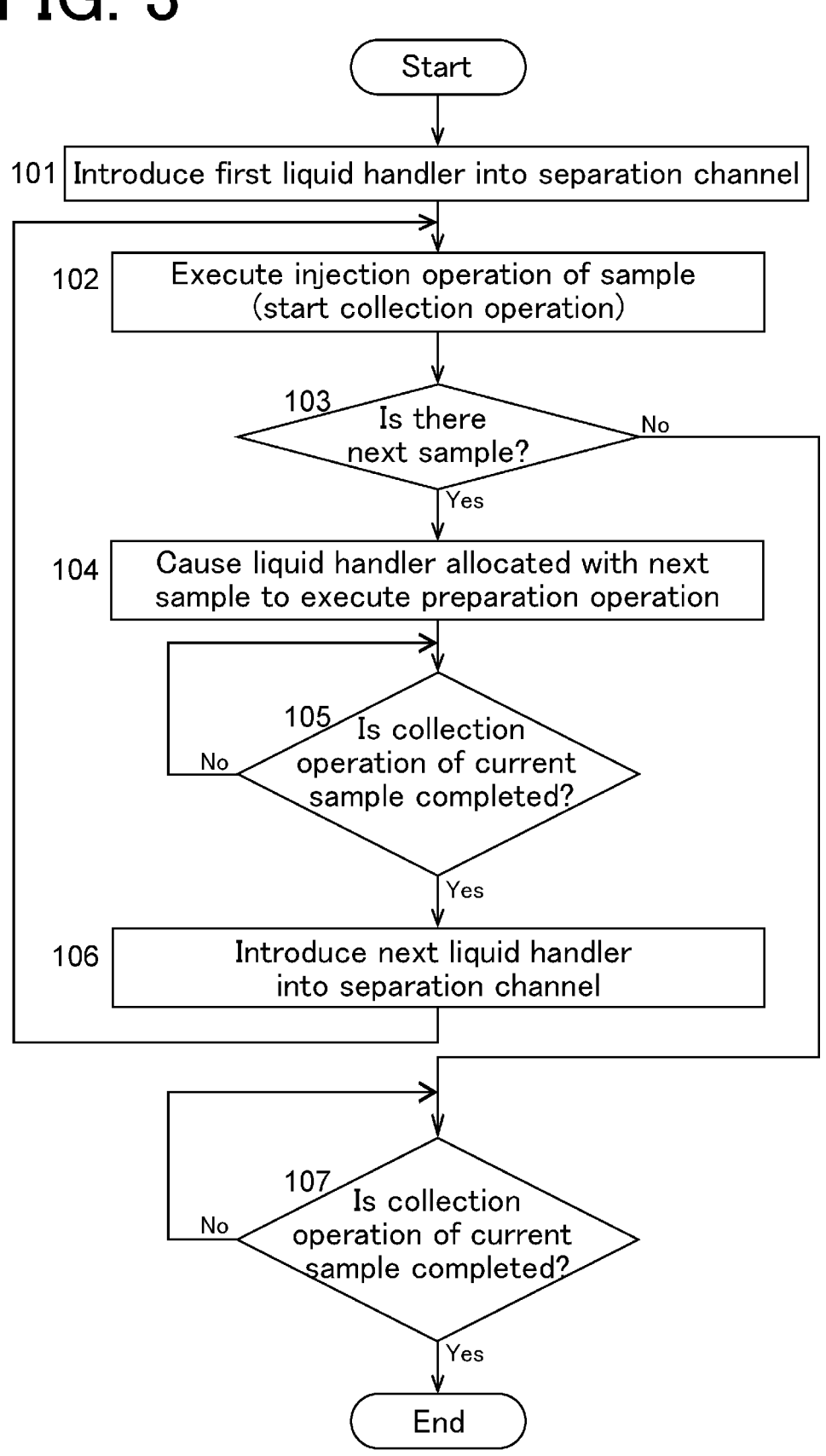
FIG. 3 is a flowchart for explaining an example of operation of the implementation example.

An example of operation of the preparative liquid chromatograph of the present implementation example will be described with reference to a flowchart of FIG. 3 together with FIGS. 1 and 2.

A plurality of samples to be separated and collected are distributed to and installed in the liquid handlers 8-1 to 8-$n$ by the user. When an instruction to start separation and collection is input to the controller 40, the controller 40 first introduces a liquid handler in which a sample for which separation and collection are to be performed is installed into the separation channel 1 (Step 101), and causes the sample to be injected into the injecting part 16 of the liquid handler (Step 102). By the above, collection operation of a component in the sample is started. Preparation operation in a first liquid handler, that is, operation of cleaning the needle 20 and operation of sucking a sample from a sample container may be executed before the first liquid handler is introduced into the separation channel 1, or may be executed after the first liquid handler is introduced into the separation channel 1.

In a case where a sample (next sample) for which separation and collection are to be performed next exists (Step 103), the controller 40 causes a liquid handler (next liquid handler) to which the next sample is allocated (installed) to execute preparation operation for sample injection (Step 104). The preparation operation includes at least operation of sucking a sample from a tip of the needle 20. When collection operation of a sample being executed is completed (Step 105: Yes), the controller 40 switches the switching valves 10, 12, and 14 to introduce the next liquid handler into the separation channel 1 (Step 106), and immediately injects a sample sucked from a tip of the needle 20 in advance by the preparation operation into a mobile phase (Step 102). After the above, Steps 102 to 106 are repeated for all samples, and when collection operation of a last sample is completed, the operation ends (Step 107). Note that, whether or not collection operation of a sample is completed can be determined by whether or not predetermined time elapses from detection of a last peak or whether or not predetermined time elapses after injection of a sample into a mobile phase.

Figure 4:
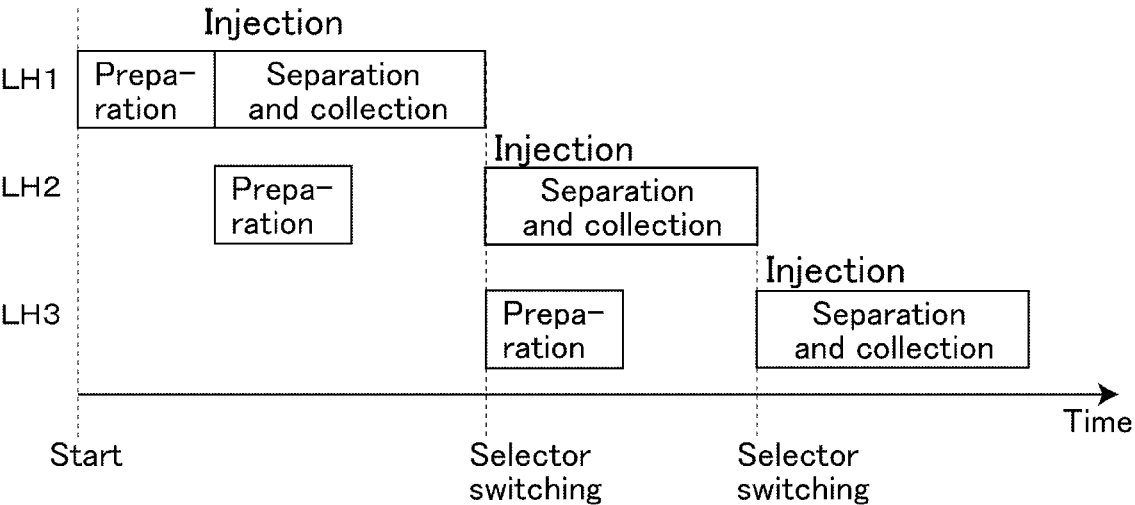
FIG. 4 is a timing chart for explaining an example of operation of each liquid handler in the implementation example.

By the above operation, it is possible to realize continuous separation and collection of a plurality of samples as illustrated in FIG. 4. That is, while separation and collection of a first sample using a liquid handler (LH1) to which the first sample is allocated are executed, preparation operation of a liquid handler (LH2) to which a second sample is allocated is completed, and separation and collection of the second sample using the liquid handler (LH2) are started at the same time as separation and collection of the sample using the liquid handler (LH1) are completed. Then, while separation and collection of the second sample using the liquid handler (LH2) are executed, preparation operation of a liquid handler (LH3) to which a third sample is allocated is completed, and separation and collection of the third sample using the liquid handler (LH3) are started at the same time as separation and collection of the second sample using the liquid handler (LH2) are completed.

Note that, in the above example, start of separation and collection after injection of a previous sample into a mobile phase is used as a trigger to start preparation operation of a next liquid handler, but the present invention is not limited to this configuration. In short, preparation operation of a liquid handler that is to be introduced into the separation channel 1 to execute injection operation and collection operation of a sample only needs to be completed before the liquid handler is introduced into a separation channel.

The implementation example described above is merely one example of an embodiment of the preparative chromatograph according to the present invention. The embodiment of the preparative chromatograph according to the present invention is as described below.

An embodiment of a preparative liquid chromatograph according to the present invention includes a separation channel provided with a liquid delivery pump for feeding a mobile phase, a separation column for separating a component in a sample, and a detector for detecting a peak of a component separated by the separation column, a plurality of liquid handlers each including an injecting part that functions as an injector that executes injection operation of a sample into a mobile phase flowing through the analysis channel upstream of the separation column in the analysis channel when introduced into the separation channel and a collecting part that functions as a fraction collector that executes collection operation of a peak of a component separated in the separation column when introduced into the separation channel, a selector for selectively switching a liquid handler to be introduced into the separation channel among a plurality of the liquid handlers, and a controller that controls operation of a plurality of the liquid handlers and the selector, the controller being configured to introduce a plurality of the liquid handlers into the separation channel in predetermined order, cause each of the liquid handlers to execute the injection operation and the collection operation, and sequentially execute separation and collection of a plurality of samples allocated to each of a plurality of the liquid handlers. The controller is configured to cause each of a plurality of the liquid handlers to execute preparatory operation for the injection operation while another one of the liquid handlers is being introduced into the separation channel, and to execute the injection operation immediately after the another one of the liquid handlers is introduced into the separation channel.

In a first aspect of the embodiment mentioned above, the controller is configured to cause the liquid handler to be introduced into the separation channel next to start the preparation operation when the liquid handler introduced into the separation channel executes the injection operation.

In a second aspect of the embodiment mentioned above, the injecting part includes a needle for performing suction and dispensation of a sample, the collecting part includes a probe for dropping eluate from the separation column to a collection container, and the preparative liquid chromatograph is configured so that the needle and the probe are three-dimensionally moved by a common moving mechanism. In a liquid handler in which a common moving mechanism is used for a needle of an injecting part and a probe of a collecting part, the needle and the probe cannot operate independently of each other, and thus, it is not possible to execute preparation operation for injection of a next sample, such as suction operation of a next sample, while executing collection operation of a sample using the probe. For this reason, in a preparative liquid chromatograph including only one liquid handler, separation and collection of a plurality of samples cannot be continuously executed. In the present invention, even with the liquid handler in which a common moving mechanism is used for the needle of the injecting part and the probe of the collecting part, a plurality of such liquid handlers can be used in combination to continuously execute separation and collection of a plurality of samples.

DESCRIPTION OF REFERENCE SIGNS

1: Separation channel
2: Liquid delivery pump
4: Separation column
6: Detector
8-1 to 8-$n$: Liquid handler
10, 12, 14: Switching valve
16: Injecting part
18: Collecting part
20: Needle
22: High-pressure valve
24: Syringe
26: Moving mechanism
28: Injection port
30: Inlet channel
32: Outlet channel
34: Probe
36: Electromagnetic valve
38: Collection channel
The invention claimed is:
1. A preparative liquid chromatograph comprising:
a liquid delivery pump for feeding a mobile phase;
a separation column fluidly connected downstream of the liquid delivery pump and for separating components in a sample from each other;
a detector fluidly connected downstream of the separation column to detect peaks of the components separated from each other by the separation column;
a plurality of liquid handlers each including an injecting part configured to function as an injector, which is for executing injection operation of a sample into the mobile phase, when fluidly connected between the liquid delivery pump and the separation column, and a collecting part configured to function as a fraction collector, which is for executing collection operation of peaks of the components separated from each other in the separation column, when fluidly connected downstream of the detector, wherein the injecting part includes a needle for performing suction and dispensation of a sample, the collecting part includes a probe for dropping eluate from the separation column to a collection container, each of the plurality of liquid handlers have single moving mechanism and are configured so that the needle and the probe are three-dimensionally moved together by the moving mechanism, a separation channel is fluidly connected using one of the plurality of liquid handlers when the injecting part of the one of the plurality of liquid handlers is inserted between the liquid delivery pump and the separation column and the collecting part of the one of the plurality of liquid handlers is fluidly connected downstream of the detector;

a plurality of switching valves for selectively switching a liquid handler used for fluidly connecting the separation channel among the plurality of liquid handlers; and a controller for controlling operation of the plurality of liquid handlers and the plurality of switching valves, the controller being configured to use the plurality of liquid handlers for fluidly connecting the separation channel in predetermined order, to cause each of the liquid handlers to execute the injection operation and the collection operation, and to sequentially execute separation and collection of a plurality of samples allocated to each of the plurality of liquid handlers, wherein the controller is configured to cause each of the plurality of liquid handlers to execute preparation operation for the injection operation while another one of the liquid handlers is used for fluidly connecting the separation channel, and to execute the injection operation immediately after being used for fluidly connecting the separation channel.

2. The preparative liquid chromatograph according to claim 1, wherein the controller is configured to cause the liquid handler to be used next for fluidly connecting the separation channel to start the preparation operation when the liquid handler used for fluidly connecting the separation channel executes the injection operation.

* * * * *